(12) United States Patent
Harmon

(10) Patent No.: US 7,926,030 B1
(45) Date of Patent: Apr. 12, 2011

(54) CONFIGURABLE SOFTWARE APPLICATION

(75) Inventor: Tonya Joy Harmon, Great Falls, VA (US)

(73) Assignee: Harmony Information Systems, Inc., Reston, VA (US)

( * ) Notice: Subject to any disclaimer, the term of this patent is extended or adjusted under 35 U.S.C. 154(b) by 1169 days.

(21) Appl. No.: 11/540,509

(22) Filed: Oct. 2, 2006

Related U.S. Application Data

(60) Provisional application No. 60/722,013, filed on Sep. 30, 2005.

(51) Int. Cl.
*G06F 9/44* (2006.01)
(52) U.S. Cl. .................................................... 717/121
(58) Field of Classification Search .......... 717/100–113, 717/120–123
See application file for complete search history.

(56) References Cited

U.S. PATENT DOCUMENTS

| | | | |
|---|---|---|---|
| 5,950,001 A | 9/1999 | Hamilton et al. | 395/701 |
| 5,950,011 A | 9/1999 | Albrecht et al. | 395/712 |
| 6,269,473 B1 | 7/2001 | Freed et al. | 717/1 |
| 6,681,382 B1 | 1/2004 | Kakumani et al. | 717/122 |
| 6,775,819 B1 | 8/2004 | Hardikar et al. | 717/105 |
| 2002/0104069 A1 | 8/2002 | Gouge et al. | 717/107 |
| 2005/0015745 A1 | 1/2005 | Wain et al. | 717/105 |
| 2005/0240917 A1 | 10/2005 | Wu | 717/162 |
| 2005/0246304 A1 | 11/2005 | Knight et al. | 706/47 |
| 2005/0246686 A1 | 11/2005 | Seshadri et al. | 717/117 |
| 2005/0251788 A1 | 11/2005 | Henke et al. | 717/109 |
| 2005/0262501 A1 | 11/2005 | Marinelli et al. | 717/174 |
| 2006/0117309 A1 | 6/2006 | Singhal et al. | 717/162 |
| 2006/0143570 A1 | 6/2006 | Washington et al. | 715/763 |

OTHER PUBLICATIONS

Netscape Application Builder, "User's Guide", 1999, Netscape Communications corp., Chapters 1-10, 254 pages.*

* cited by examiner

*Primary Examiner* — Ted T Vo
(74) *Attorney, Agent, or Firm* — Pillsbury Winthrop Shaw Pittman LLP

(57) ABSTRACT

A configurable software application is provided, where the software application may be designed on a platform including at least one configuration utility for enabling end users to customize various aspects of the application. For example, end users may use the configuration utility to customize one or more user interface elements, event handlers, data handlers, and/or data elements of the application. The software application may be automatically updated to incorporate the user customizations. In one implementation, custom user interface elements may be used to control a navigation of the application or an interaction with data elements of the application. In another implementation, custom data elements, based on a hierarchical metadata structure, may dictate an organization of the application. In another implementation, custom event handlers may control business logic and rules for the application, while custom data handlers may control interfacing with the data elements.

33 Claims, 3 Drawing Sheets

CONFIGURABLE SOFTWARE APPLICATION

CROSS-REFERENCE TO RELATED APPLICATIONS

This application claims the benefit of U.S. Provisional Patent Application Ser. No. 60/722,013, entitled "Configurable Software Application," filed Sep. 30, 2005, the contents of which are hereby incorporated by reference in their entirety.

FIELD OF THE INVENTION

The invention relates generally to a configurable software application, and in particular, to a software application that can be easily redesigned by end users.

BACKGROUND OF THE INVENTION

One of the major concerns of software developers is providing applications that meet the needs of a broad variety of end-users. However, it is often difficult or impracticable to design an application that is universally tailored for all users. This is particularly the case for enterprise applications, where each business or enterprise often has a unique organizational structure, business tasks and rules, presentation preferences, or other unique needs. End users are typically not able to fully customize applications for their own needs. Rather, customization most often requires a software developer to redesign the application, which can introduce significant delays for the time to design, develop, and deploy the custom application. Moreover, significant costs can be introduced in the form of compensating the developer, installer, and/or troubleshooter, as well as in the form of opportunity costs due to system downtime.

Therefore, what is needed is a software framework that is fully customizable for many different purposes without custom programming.

SUMMARY OF THE INVENTION

According to various aspects of the invention, a software application may be easily reconfigured to meet unique needs of end users without custom programming. The software application may include one or more configuration utilities that expose the application framework, such that end users may reconfigure the application for any purpose. For example, a veterinarian clinic may configure the application to track pets and their treatments, law firms may configure the application to track clients and their cases, or a catering company may configure the application to build recipes and track catering events.

In one implementation of the invention, a framework application with a generally consistent user interface may be deployed to a wide variety of customers. The framework application may be tailored for various unique needs using one or more user-friendly configuration utilities that enable users to configure at least data elements, controls, data handlers, and/or event handlers of the application. The application may be designed as a Service Oriented Architecture (SOA) (or similar technology) that loosely couples interoperable software services to support requirements of business processes and users. The architecture may provide flexibility by decoupling a presentation layer, a business services layer, and a data control layer from one another.

According to an aspect of the invention, the application may include one or more configuration utilities that provide end users with control to modify the application in response to changing conditions, without custom reprogramming. For example, a configurable presentation layer may expose autonomous framework controls to provide a consistent way of navigating and interacting with data. A presentation and/or invocation of the framework controls may be configured through the one or more configuration utilities. Moreover, informational content in the presentation may be controlled by configuring a hierarchical metadata structure, which may enable users to quickly reconfigure the application for new business requirements. In another example, configurable event handlers may include rules and/or business logic for the application. Thus, users may control, among other aspects, which records are accessible and when, how to handle exceptions, when to take certain actions, how to respond to certain events, etc. In still another example, configurable data handlers may expose subject matter agnostic data services for creating, reading, writing, modifying, deleting, converting, or performing other actions on data elements in a data source. The configurable data handlers may be enable users to attach external services or applications by converting data from a first format to a second format (e.g., when data is being communicated between services, such as between the application and a batch print server or an Interactive Voice Recognition (IVR) service).

According to another aspect of the invention, a configurable metadata structure may be organized hierarchically and may control informational content presented to a user. Every aspect of the application may be described and/or controlled by metadata, including individual data elements, resources (e.g., documents, pages, fields, etc.), collections (e.g., people or other entities), as well as relationships within and between resources and collections (e.g., chapters, lines of business, etc.). One or more configuration utilities may be provided to enable users to customize a data organization of the application by creating custom metadata records, extending existing records, and/or extending an existing database, thereby enabling creation of potentially unlimited permutations of the data organization. The metadata structure may provide a formalized, structured framework in which to describe data.

The metadata structure may include an assignment of users to one or more roles within the application (e.g., according to an organization of an enterprise), and each role may be assigned to a group defining information that a user can see and/or manipulate. The groups may also define a security level for chapters, pages, and fields within each group. An organization or enterprise using the application may create unlimited groups and/or roles, and distinct chapters, pages, sections, and/or fields may exist across groups. Properties of a group may be defined by one or more metadata columns, each of which may have an associated data type, providing a structure for users to create custom groups.

Each group may include one or more chapters representing a highest-level category of information to display to a user. A user of the application may add new chapters or modify existing chapters, and framework controls may be assigned to the new and/or modified chapters to create a new use for the application. Users may configure the chapters using one or more configuration utilities that may include a SQL Stored Procedure (SP) generator for creating any necessary SPs to view, add, delete, and/or edit data. Properties of a chapter may be defined by one or more metadata columns, each of which may have an associated data type, providing a structure for users to create custom chapters.

Each chapter may be sub-divided into one or more pages, sections, and fields controlled through metadata. Users may use one or more configuration utilities to configure pages and elements within pages in unlimited ways, including creating custom pages and data elements within the pages. For example, users may connect one or more desired controls for viewing, adding, and/or editing records, controlling a presentation style of records, or otherwise controlling pages. Users may create custom pages or fields using the exposed SQL SP generator, as all controls may be subject matter neutral to enable the controls to be used anywhere in the application as desired. Properties of a page may be defined by one or more metadata columns, each of which may have an associated data type, providing a structure for users to create custom pages. In addition to having properties for controlling content and presentation (e.g., view as single records, list view, sub-pages of another page, etc.), a page may include a page menu and page controls, where page controls may include page control properties and/or page control events. Properties of page menus, page control properties, and/or page control events may be defined by one or more metadata columns, each of which may have an associated data type, providing a structure for users to create custom page menus, control properties, and/or control events. Each page control event may include sub-elements for defining an event service and one or more parameters for the event service. Each page may be divided into one or more sections. Properties of a section may be defined by one or more metadata columns that specify which pages have sections, how many sections a page may have, and/or how sections are to appear. Moreover, each section may include a section menu, where properties of section menu may be defined by one or more metadata columns.

Individual data fields in the application may be controlled by metadata for field controls defining which fields are to be displayed within a group, chapter, page, etc. Properties of field controls may be defined by one or more metadata columns in metadata associated with the field controls, each of which may have an associated data type, and each field control may include one or more field control properties and/or one or more field control events. Each field control event may include sub-elements for defining a field control event service and one or more parameters for the field control event service.

According to another aspect of the invention, a user interface may be populated though a data-driven process, thereby incorporating user customizations from the configuration utilities without custom programming or recompiling the application. The user customizations may extend (i.e., customize) various aspects of the application, including user interface elements, event handlers, data handlers, and/or data elements of the application. For example, users can use the one or more configuration utilities to create custom metadata chapters, pages, sections, and/or fields (and sub-elements thereof), custom event handlers and/or custom data handlers for interacting with and controlling rules for the application, and/or custom user interface elements for controlling a presentation, navigation, and/or interaction with the application.

The population process may begin with receiving a request for a page, and the application may perform pre-processing to identify a requested chapter identifier, page identifier, record identifier, and/or other information. The pre-processing may include evaluating the page request to identify necessary information, and framework configured defaults may supplement the request when pertinent information is missing from the request. The application may then determine whether the user is logged in (e.g., when the user is in an active data session). When the user is not already logged in, the request may be redirected to a log-in page, where a registered user may enter a user identifier and/or password, or an anonymous user may log in as a guest. If the user is authenticated, information about the user may be retrieved from a database and updating an event log with information about the request. Retrieving the information may include identifying one or more roles for the user. The user may then be validated using any suitable technique for processing a log-in and authenticating users. For example, the application may be configured to enable connectivity with any authentication service by providing an extension point for implementing various types of authentication needs (e.g., Active Directory, Lightweight Directory Access Protocol, or a custom authentication service).

Once the user has logged in and been authenticated, a context for the request may be identified. A per-request framework context container may be built to contain all information specified in the request, and a framework page may be built. The framework page may be a basic page layout representing a consistent façade for all basic functionality in the application, as well as root server side controls (e.g., basic menus, exception handling, capture capabilities, controls for a user to change roles, controls for searching, etc.). The framework page may also serve as a starting point for page-specific functionality by retrieving a list of chapters that the user has access to (e.g., based on an association between the user's role and metadata chapters) and populating a page control container by retrieving a list of page controls to display on the page. The list of page controls may be based on a combination of information in the request, a user's role, or other factors. An instance of each page control in the list of page controls may be created and loaded into the page. The structured metadata (as described above) may define which SPs and/or views the page controls should use to retrieve and/or present data. After retrieving all of the page controls for the user, each page control may retrieve a list of fields to display in the respective page controls.

After each framework control, page control, and field control has been loaded, the controls may be bound to a database. Binding the controls may include calling a business entity controller, which may use information in a page and/or field control to call a necessary SP to retrieve corresponding data to display. Error information encountered during the process of loading the page may be gathered and packaged for display to the user. All data for presentation may then be packaged and displayed to the user, at which time the user has a fully populated screen with which the user may use to add, edit, search, or otherwise interact with data.

Other objects and advantages of the invention will be apparent to those skilled in the art based on the following detailed description and accompanying drawings.

DETAILED DESCRIPTION

Figure 1:
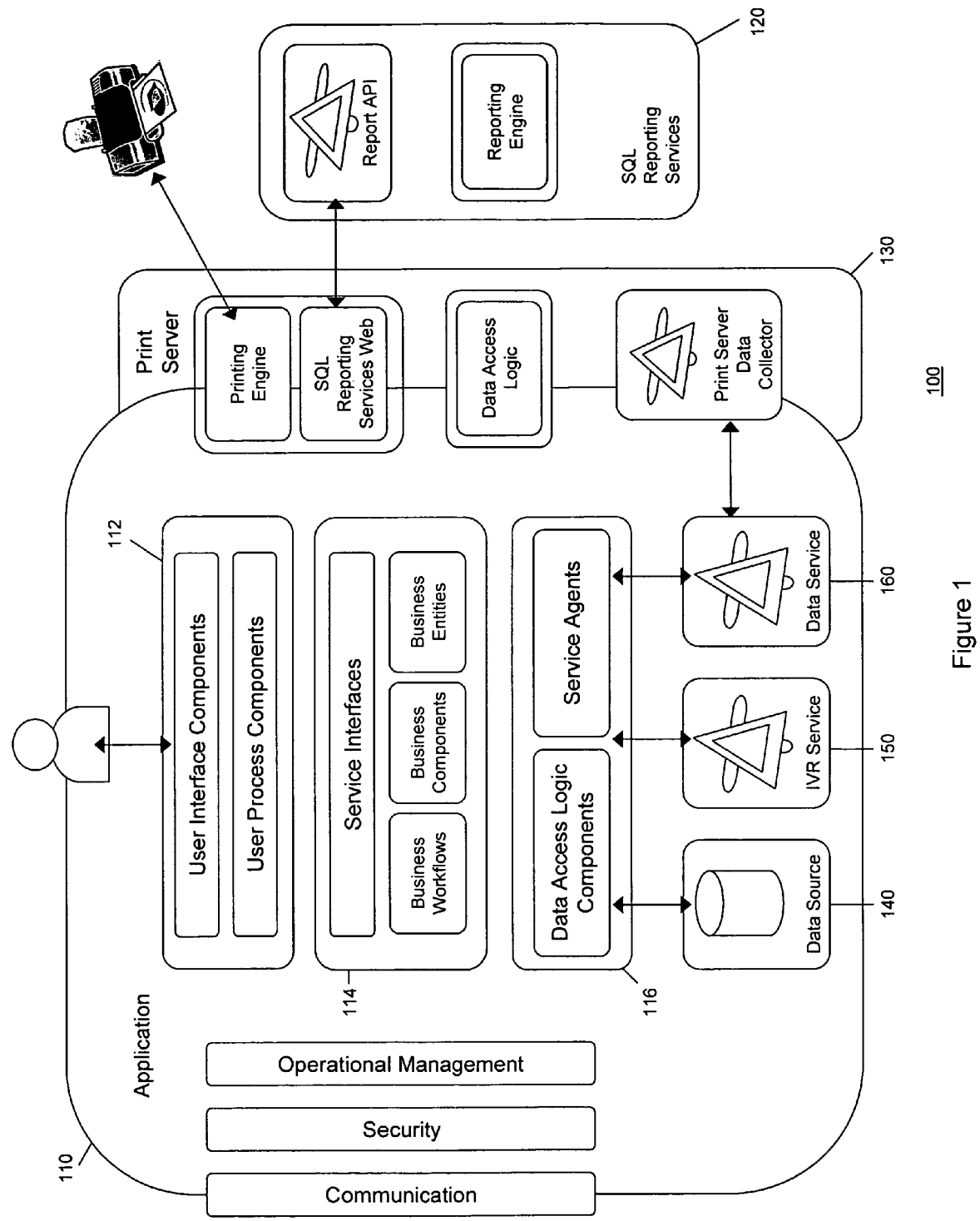
FIG. 1 is an exemplary block diagram of a system architecture according to one aspect of the invention.

According to various aspects of the invention, a configurable software application is provided that may be easily reconfigured to meet unique needs of end users without custom programming. The software application may include one or more configuration utilities that expose the application framework, such that end users may reconfigure the application for any purpose. For example, a veterinarian clinic may configure the application to track pets and their treatments, law firms may configure the application to track clients and their cases, or a catering company may configure the application to build recipes and track catering events. Those skilled in the art will recognize that various enterprises, businesses, and users may have different organizational and functional needs, and the application may be uniquely configured according to the unique needs.

In one implementation, a framework application may be deployed to a wide variety of customers. The framework application may have a generally consistent user interface for all users and program areas. Because a single framework houses the entire application, and thus all program areas within an enterprise, core data may be shared across program areas, as defined in a data organization of the application. Moreover, because a consistent user interface is used to present information, users only need to learn a single system, such that the users can be easily integrated into new program areas as they are added. Additionally, business users or other staff may make personal changes to the application in response to personal preferences or changing requirements, which may reduce or eliminate needs for extensive systems life cycle development.

The framework application may be tailored to meet various specific and unique needs, potentially with vastly different implementations. Moreover, the application may be configured to meet different needs for various business units or program areas within an enterprise, and the application may be further configured to provide different roles to users within a business unit or program area. For example, users may be assigned roles in various program areas of an enterprise, such as for day-to-day business tasks, finance and billing, human resources, or other areas, and the application may be tailored to meet unique needs for each program area. In addition, individual users or groups of users within a program area may have different tasks, responsibilities, etc., such that the application may be further configured to meet unique needs of users within a business unit or program area. The application may include one or more user-friendly configuration utilities for enabling users to configure at least data elements, controls, data handlers, and/or event handlers of the application. In one implementation, the application may be upgraded during its lifecycle (e.g., via a subscription interface) to provide additional framework controls that can be used, extended, and/or modified throughout the application.

By allowing end users or individual enterprises to modify the application to their own unique needs, various tangible and intangible benefits may be realized. For example, design, development, installation, integration, and/or maintenance costs may be reduced. For example, few or no programmers may be needed to modify or reconfigure the framework application, ongoing maintenance may be decreased, hardware costs may be substantially less than a mainframe system, and time to deploy may be substantially less. In addition, time to train staff may be substantially reduced, as all users may be trained on the framework application and how to interact with and configure the framework application. Those skilled in the art will recognize additional benefits of providing users with capabilities of effecting custom extensions upon framework features.

FIG. 1 illustrates a block diagram of an exemplary system architecture 100 according to one aspect of the invention. In one implementation, architecture 100 may be based on a Service Oriented Architecture (SOA) that may define loosely coupled and interoperable software services to support requirements of business processes and users. SOAs may facilitate developing platform-independent applications, or web-based applications, which may provide benefits such as integrating with legacy systems, modifying applications in response to changing conditions, and/or interfacing with external applications or tasks. SOAs are known to those skilled in the art, and similar technology may be employed without departing from the scope of the invention. Architecture 100 may provide maximum flexibility for configuring an application 110 by decoupling a presentation layer 112, a business services layer 114, and a data control layer 116 from one another. In one implementation, application 110 may include one or more modules for controlling operational management, security, and/or communication of application 110, and the operational management, security, and/or communication modules may, in operation, be based upon rules, logic, data, or other information specified in one or more of configurable layers 112-116.

According to an aspect of the invention, application 110 may include one or more configuration utilities that provide end users with control to modify application 110 in response to changing conditions, without custom reprogramming. For example, a configurable presentation layer 112 may include, among other aspects, one or more configurable user interface components and one or more configurable user process components, which may be driven by metadata stored in a data source 140. Configurable presentation layer 112 may expose autonomous framework controls that may be standardized throughout the application to provide a consistent way of navigating and interacting with data. A presentation and/or invocation of the framework controls may configured through the one or more configuration utilities, where the configurable controls may include, among other aspects, controls for screen presentation, menu bars, help, navigation, wizards, rule processing, reporting, tickler managing, standard phrases, look ups, merging, printing, chapter control, page control, field control, history tracking, audit trails, image handling, approvals, or other controls. In one implementation, the framework controls may be updated throughout the lifecycle of application 110 (e.g., through a subscription interface). Moreover, informational content in the presentation may be controlled by configuring metadata, which may enable users to quickly reconfigure application 110 to meet new business requirements. Metadata configuration is described in greater detail in FIG. 2 below.

According to another aspect of the invention, application 110 may include configurable event handlers within business services layer 114. Business services layer 114 may include among other aspects, one or more service interfaces to controls rules and/or business logic for application 110. The service interfaces may interact with one or more configurable services, such as business workflow services, business component services, and/or business entity services. Business services layer 114 may expose rules and/or business logic for application 110, and the configuration utilities may enable users to define configurable event handlers and for controlling, among other aspects, which records are accessible and when, how to handle exceptions, etc. The event handlers may be fully exposed through the configuration utilities, or directly through data source 140. In one implementation, data source 140 may be designed as a SQL server database, and data source 140 may contain scheduled jobs, views, tables, or other handlers for generating queries and business rules in application 110.

The configurable event handlers may operate between presentation layer 112 and metadata in data source 140 to determine when certain actions are to be taken, how to respond to certain events, etc. For example, event handlers may be configured to determine when to fire a tickler, when to issue a warning, when to raise an alert, and when to display or enable access to certain data elements. In one implementation, the configurable event handlers may include, among other aspects, chapter event handlers, page event handlers, field event handlers, rule processing handlers, workflow wizard handlers, reporting services, or other event handlers. An event may be defined in various ways, such as an occurrence of specific values in one or more fields on a screen, where a workflow wizard (or other event handler) may guide a user through a task when a predetermined event occurs. For example, in one implementation, a task may be data entry for one or more framework screens or user-defined screens, running a user-defined report or correspondence, running a stored procedure or reminder to complete a task, or other tasks. Tasks may be assigned to specific users or to specific roles defined in application 110.

According to another aspect of the invention, application 110 may include configurable data handlers within data control layer 116. Data control layer 116 may include, among other aspects, one or more service agents for interacting with data stored in data source 140, and one or more data access logic components for communicating with data source 140. Data control layer 116 may expose subject matter agnostic data services for creating, reading, writing, modifying, deleting, converting, or performing other actions on data elements in data source 140. The data handlers may be fully exposed through the configuration utilities, or directly through data source 140. In one implementation, data source 140 may be designed as a SQL server database, and data source 140 may contain stored procedures and configurable handlers for controlling access to metadata in data source 140. For example, a data handler may be configured to determine how to convert data from a first format to a second format (e.g., when data is being communicated between services, such as between application 110 and a batch print server 130, an Interactive Voice Recognition (IVR) service 150, or other services). In one implementation, configurable data handlers may include, among others, table data handlers, chapter data handlers, page data handlers, field data handlers, configurable stored procedures, configurable views, or other data handlers.

Exposing a framework of application 110 as described above may facilitate connectivity with external applications, such as IVR service 150 or one or more other data services 160. For example, in one implementation, data service 160 may be defined as a batch printing service when an enterprise desires to configure application 110 to meet batch printing needs. The batch printing service may be implemented as a printing engine housed on a print server 130. Print server 130 may thus include data access logic and a print server data collector for interacting with data of application 110 (e.g., through a configurable data handler). By designing application 110 on an SOA (or similar technology), the print server data collector and the data access logic may communicate with data service 160 using any communication method known to data service 160 and the print server, and the configured data handler may handle any necessary data conversions. Data service 160 may thus use the configured data handler to access data source 140 via service agents that communicate with data access logic components in data control layer 116. The data may optionally be provided to an SQL reporting service 120 for further processing using a report application program interface (API). In another implementation, reporting service 120 may be configured and/or created in Crystal Reports or other ODBC compliant report writers to be added into chapter or pages of application 110. Those skilled in the art will recognize additional ways to use a fully exposed application framework, built upon an SOA (or similar technology) to interface with various enterprise tasks and to tailor an application to an enterprise's needs.

Figure 2:
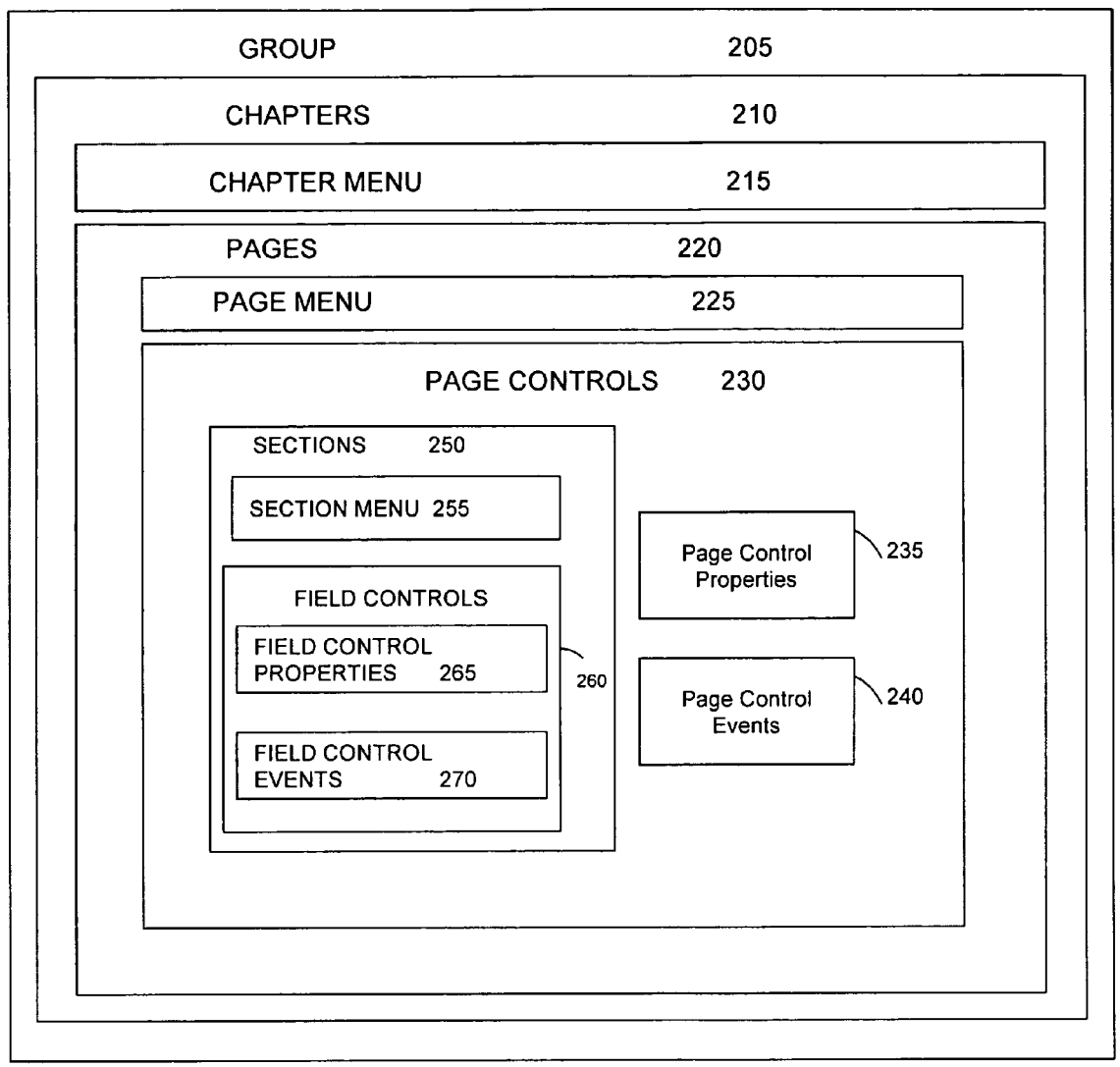
FIG. 2 is an exemplary block diagram of a metadata structure according to one aspect of the invention.

FIG. 2 illustrates an exemplary block diagram of a metadata structure 200 according to one aspect of the invention. Metadata structure 200 may be organized hierarchically, wherein informational content presented to a user (e.g., via presentation layer 112) may be stored in metadata. Metadata structure 200 may include a complete database describing aspects of application 110 as well as data source 140. Every aspect of application 110 may be described and/or controlled by metadata, including individual data elements, resources (e.g., documents, pages, fields, etc.), collections (e.g., people or other entities), as well as relationships within and between resources and collections (e.g., chapters, lines of business, etc.). For example, in one implementation, application 110 may be configured as a human services application, and consumers (i.e., persons receiving services) and providers (i.e., organizations and/or persons providing the services) may be chapters within application 110. One or more configuration utilities may be provided to enable users to customize a data organization of application 110 by creating custom metadata records, extending existing records, and/or extending an existing database, thereby enabling creation of potentially unlimited permutations of the data organization. In one implementation, configurable metadata elements may include, among others, chapters, pages, fields, control calls, roles, queues, security, business rules, web page designs, reports, workflow wizards, look ups, ticklers, or other data elements.

According to one aspect of the invention, metadata structure 200 may enable a user to easily communicate between organizations, and may facilitate meeting new business requirements by providing a formalized, structured framework in which to describe data. In one implementation, hierarchical metadata structure 200 may include a group structure 205 at a highest level. Groups 205 may include chapters 210, which may define a highest level of a data collection (e.g., "Consumers"). Chapters 210 may include data sub-collections referred to as pages 220, where each page 220 may have containership to contain information related to chapter subject matter. For example, containers may hold information related to events and/or tasks triggered on a page. By configuring pages 220, users may configure various screens in application 110. That is, one or more configuration utilities may be provided to enable users to design screens accessed from within the containers.

Pages 220 may include (contain) a page menu 225 and page controls 230. Page controls 230 may be further sub-divided into page control properties 235 and page control events 240. Sub-pages (not shown) and data sections 250 may be contained within a page 220. Sections 250 may include a section menu 255, and field controls 260 may be contained within a section 250 at a lowest level of metadata structure 200. Field controls 260 may include field control properties 265 and field control events 270, and a field control table (collectively elements 260-270) may identify which data elements appear on a display. In one implementation, each table (i.e., groups 205, chapters 210, pages 220, sections 250, fields 260, etc.) of metadata structure 200 may include one or more metadata columns that define a set of properties for the table.

According to one aspect of the invention, users may be assigned one or more roles within application 110 (e.g., according to an organization of an enterprise). Each role may be assigned to a group 205, which may define information that a user can see and/or manipulate. For example, the user may be able to see and/or manipulate chapters 210, pages 220, sections 250, and/or fields 260 (and sub-sections thereof) within a group 205 that the user is a part of. Groups 205 may also define a security level for each chapter 210, page 220, and field 260 within the group (e.g., whether a user can add, edit, view, and/or delete data). An organization or enterprise using application 110 may create unlimited groups and/or roles, and distinct chapters 210, pages 220, sections 250, and/or fields 260 may exist from one group 205 to another. Properties of the groups 205 may be defined by one or more metadata columns, each of which may have an associated data type (represented in parentheses as follows). For example, a group 205 may include metadata columns for a group identifier (integer), a group name (string), a user association (string), a time stamp (date), an application type (string), and/or other properties.

According to another aspect of the invention, after identifying which group 205 a user belongs, one or more chapters 210 within the group 205 may be identified. Chapters 210 may represent a highest-level category of information to display to a user. For example, application 110 may be configured for a human-services enterprise, which may elect to configure chapters 210 for Consumers, Resources, Providers, Reports, Authorizations, Billing, Inquiries, Scheduling, Utilities, or other categories. A user of application 110 may add new chapters 210 or modify existing chapters 210, and framework controls may be assigned to the new and/or modified chapters 210, thereby creating a new use for application 110. Users may configure chapters 210 using one or more configuration utilities that may include a SQL Stored Procedure (SP) generator for creating any necessary SPs to view, add, delete, and/or edit data. Properties of a chapter 210 may be defined by one or more metadata columns, each of which may have an associated data type (represented in parentheses as follows). For example, a chapter 210 may include metadata columns for a group identifier (integer), a chapter identifier (integer), a label (string), a chapter name (string), a sort order (integer), a query return value (integer), an access level (integer), a visibility (bit), a user required status (bit), a system required status (bit), a system help identifier (integer), a user help identifier (integer), a display as chapter status (bit), a unique identifier (16-bit identifier), a use in workflow wizard status (bit), an is-user's status (bit), and/or other properties. Moreover, a chapter 210 may include a chapter menu 215, which may include metadata columns for a chapter menu identifier (integer), a menu identifier (integer), a chapter identifier (integer), and/or other properties.

According to another aspect of the invention, chapters may be sub-divided into one or more pages 220, sections 250, and fields 260 that are controlled through metadata. Users may use one or more configuration utilities to configure pages 220 and elements within pages 220 (i.e., elements 225-260) in unlimited ways, including creating custom pages 220 and data elements within the pages 220. For example, users may connect one or more desired controls (e.g., the framework controls described above) for viewing, adding, and/or editing records, controlling a presentation style of records, printing, displaying a history, generating reports, firing ticklers, controlling workflows, defining filters, specifying search criteria, or other controls. Users may create custom pages or fields using the exposed SQL SP generator described above, as all controls may be subject matter neutral to enable the controls to be used anywhere in application 110 as desired. Providing users with an ability to generate custom SPs significantly advances over previous techniques of limiting user customization to re-labeling pages or fields, or turning pages or fields on and off. That is, previous techniques prevented users from creating custom pages and/or fields without custom reprogramming because SQL statements for controlling applications were hard coded.

According to another aspect of the invention, informational content within a chapter 210 may include one or more pages 220, one or more sections 250, and/or one or more fields 260 that are conceptual sub-elements of a chapter 220. For example, a Consumer chapter 220 configured for a human-services enterprise may include one or more Consumer records, where each Consumer record may include pages 220 for Demographics, OpenClose, Placements, Enrollments, Referrals, Authorizations, and/or other pages. Properties of a page 220 may be defined by one or more metadata columns, each of which may have an associated data type (represented in parentheses as follows). For example, a page 220 may include metadata columns for a chapter identifier (integer), a page identifier (integer), a parent page identifier (integer), a page type identifier (integer), a label (string), a page name (string), an access level (integer), a sort order (integer), a visibility (bit), a user-required status (bit), an is-default status (bit), a time stamp (date), an application type (string), a system required status (bit), an advanced search template status (bit), a system help identifier (integer), a user help identifier (integer), a display in tab status (bit), a unique identifier (16-bit identifier), a use in workflow wizard status (bit), an is-chapter header status (bit), an is-workflow wizard call page status (bit), a user stamp (integer), or other properties.

In addition to having properties for controlling content and presentation (e.g., view as single records, list view, sub-pages of another page 220, etc.), a page 220 may include a page menu 225 and page controls 230, where page controls 230 may include page control properties 235 and/or page control events 240. In one implementation, properties of page menu 225, page control properties 235, and/or page control events 240 may be defined by one or more metadata columns, each of which may have an associated data type (represented in parentheses as follows). For example, a page menu 225 may include metadata columns for a page menu identifier (integer), a menu identifier (integer), a page identifier (integer), or other properties. Page control properties 235 may include metadata columns for a page control identifier (integer), a page identifier (integer), a user control identifier (integer), a label (string), a control order (integer), a visibility (bit), an insert-SP name (string), an update-SP name (string), a fetch-SP name (string), a delete-SP name (string), a primary-key name (string), an Oracle package (string), a section repeat direction (integer), a section repeat columns (integer), a class (string), or other properties. Page control events 240 may include metadata columns for a page control event service identifier (integer), a page control identifier (integer), an event service identifier (integer), or other properties. Each event service identifier of a page control event 240 may include sub-elements for defining an event service and one or more parameters for the event service. For example, an event service may include metadata columns for the event service identifier (integer), an event name (string), a function name (string), an is-client side status (bit), or other properties, and an event service parameter may include metadata columns for the event service identifier (integer), an event service parameter identifier (integer), a field control identifier (integer), a parameter name (string), or other properties.

Each page 220 may be divided into one or more sections 250. For example, a Demographics page 220 (as described above) may include one or more sections 250 for General Demographics, Financial Demographics, Physical Demographics, or other sections. Properties of a section 250 may be defined by one or more metadata columns that specify which pages 220 have sections 250, how many sections 250 a page 220 may have, and/or how sections 250 are to appear. For example, a section 250 may include metadata columns for a page control identifier (integer), a section identifier (integer), a label (string), a sort order (integer), a field control repeat direction (integer), a field control repeat columns (integer), a class (string), a section label visibility (bit), or other properties. Moreover, each section 250 may include a section menu 255, where properties of section menu 255 may be defined by one or more metadata columns, which may include a section menu identifier (integer), a menu identifier (integer), a section identifier (integer), or other properties.

Individual data fields in application 110 may be controlled by metadata for field controls 260. Field controls 260 may define which fields are to be displayed within a group 205. For example, a Consumer record within a Consumer group 205 may be configured to include fields for a first name, a middle name, a last name, a status, an identifier, a case number, or other fields. Similarly, a Demographic page 220 may include fields for a salutation, an alias, a title, a date of birth, a gender, a race, a marital status, a residence type, a level of needs, a family size, a referral source, a social security number, or other fields deemed useful or necessary of a specific configuration. Properties of field controls 260 may be defined by one or more metadata columns in metadata associated with the field controls, each of which may have an associated data type (represented in parentheses as follows), and each field control 260 may include one or more field control properties 265 and/or one or more field control events 270. For example, field control properties 265 may include metadata columns for a section identifier (integer), a field control identifier (integer), a field control type identifier (integer), a label (string), a default status (bit), a sort order (integer), a user required status (bit), a visibility (bit), a read-only status (integer), a control width (integer), a client-side control identifier (string), a database field name (string), a type (string), a use in workflow wizard status (bit), a show in grid status (bit), a fetch-SP name (string), an Oracle package (string), or other properties. Field control events 270 may include metadata columns for a field control identifier (integer), a field control event service identifier (integer), an event service identifier (integer), or other properties. Each field control event service identifier of a field control event 270 may include sub-elements for defining a field control event service and one or more parameters for the field control event service. For example, a field control event service may include metadata columns for the field control event service identifier (integer), a field control event name (string), a function name (string), an is-client side status (bit), or other properties, and a field control event service parameter may include metadata columns for the field control event service identifier (integer), a field control event service parameter identifier (integer), a field control identifier (integer), a parameter name (string), or other properties.

By using the one or more configuration utilities, users may configure application 110 for various tasks. For example, one or more workflow wizards may be configured to guide the user through various tasks associated with pages 220, triggered by events within pages 220, where tasks may include completing data screens, reports, reminders to do something, or SPs that execute something. In another example, reports may be created with third-party report writing tools, and can be placed throughout application 110 for execution by the workflow wizards. For example, workflow wizards can be configured to present users with a set of tasks to complete when an event is triggered. When the event occurs, the workflow wizard may appear and, in one implementation, may present a hyperlinked set of screens. Configuring the workflow wizards may include identifying events, where the events reside in application 110, under which conditions the events occur, and/or defining tasks associated with the events.

Figure 3:
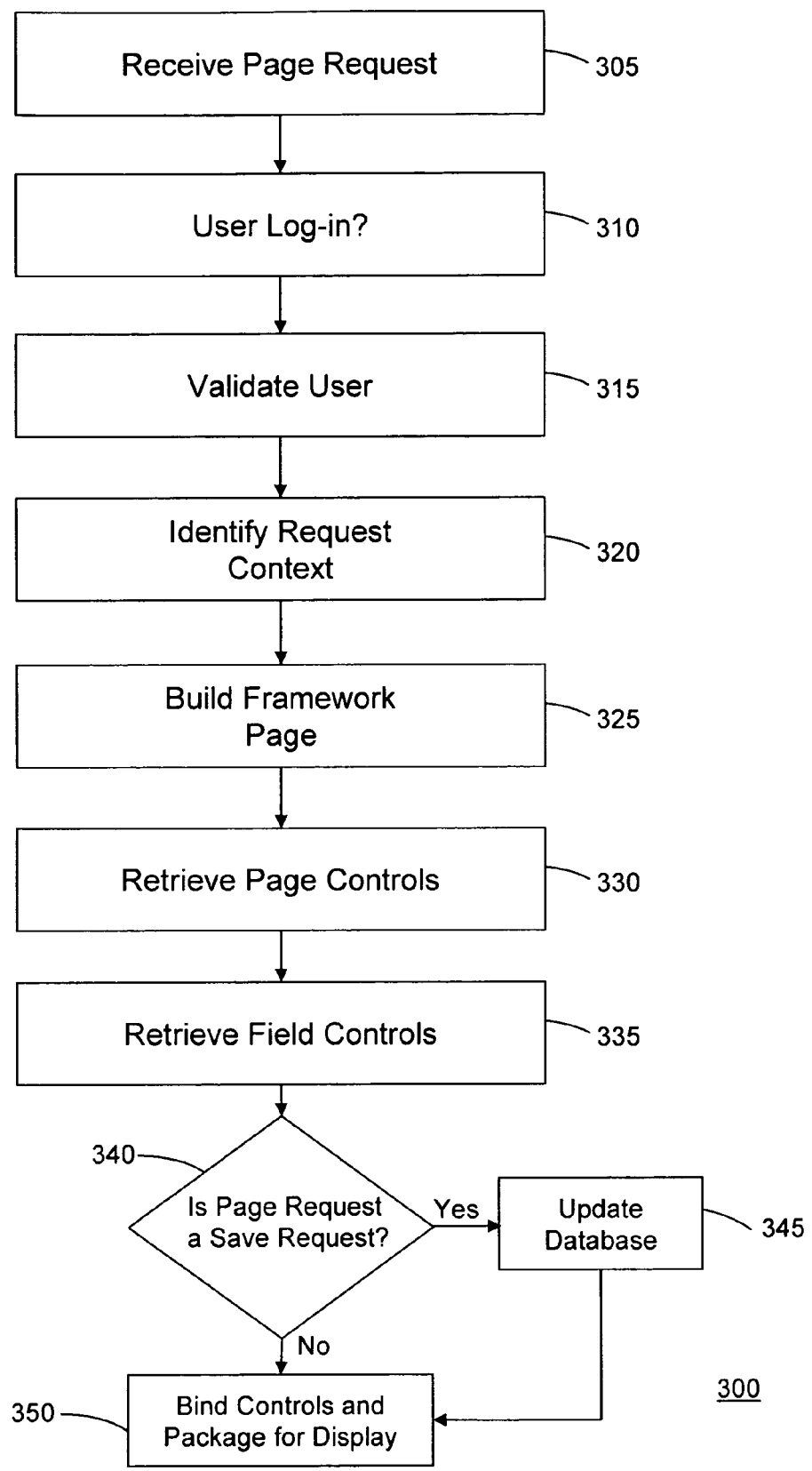
FIG. 3 is an exemplary flow diagram of a process for populating a user interface according to one aspect of the invention.

FIG. 3 illustrates an exemplary flow diagram of a process for populating a user interface according to one aspect of the invention. In one implementation, the process may be entirely data-driven, where users may enter one or more customizations using the one or more configuration utilities described above. The user customizations may extend (i.e., customize) various aspects of application 110, including user interface elements, event handlers, data handlers, and/or data elements of application 110. For example, users can use the one or more configuration utilities to create custom metadata chapters, pages, sections, and/or fields (and sub-elements thereof), custom event handlers and/or custom data handlers for interacting with and controlling rules for the application, and/or custom user interface elements for controlling a presentation, navigation, and/or interaction with the application.

The process may begin by receiving a request for a page in an operation 305. In one implementation, application 110 may have a web-based interface, and the page request may be generated when a user interacts with the web-based interface. For example, the user may click on a link or an option in the web-based interface, and the page request may comprise a Uniform Resource Locator (URL) describing a requested chapter identifier, page identifier, record identifier, and/or other information. Operation 305 may evaluate the page request to identify the requested information, and framework configured defaults may be supplied to supplement the request when pertinent information is missing from the request. Requests may be served (i.e., web pages in the web-based interface may be constructed) by accessing metadata stored in data source 140 and caching the metadata at runtime.

After performing pre-processing on the incoming request in operation 305, application 110 may determine whether the user is logged into application 110 in an operation 310, where processing may immediately proceed to an operation 315 when the user is already logged in (described below). For example, in one implementation, an active data session for the user may be encapsulated within a framework session container that includes the user's current state. Operation 310 may determine whether the session has expired by comparing a user name in an authentication cookie file to session data in the session container. In another implementation, when the user is not already logged in, or when the user is an anonymous user, the request may be redirected to a log-in page, where a registered user may enter a user identifier and/or password, or an anonymous user may log in as a guest.

The process may then proceed to an operation 315 for validating the user. Security in application 110 may be managed through roles, where roles may control access to specific screens, reports, fields, etc. Validating the user therefore may include identifying one or more roles for the user, where the user may be denied access to application 110 when the user cannot be validated. If the user can be validated, operation 315 may continue by retrieving information about the user from a database and updating an event log with information about the request. Retrieving information about the user may include identifying one or more specified roles for the user based on the user's identity. In one implementation, the user may be authenticated using an AuthenticationProvider interface that exposes authentication services, enabling application 110 to be deployed over existing systems. For example, a security configuration file may include an extension point for implementing various types of authentication needs (e.g., Active Directory, Lightweight Directory Access Protocol, or a custom authentication service). Those skilled in the art will recognize that any suitable technology may be used to process the user log-in and/or authenticate the user without departing from the scope of the invention.

Once it has been determined that the user is logged in and authenticated, a context for the request may be identified in an operation 320. Identifying the context may include building a per-request framework context container that may contain all information specified in the URL corresponding to the request. Processing then proceeds to an operation 325 where a framework page is built, where the framework page may be a basic page layout representing a consistent façade for all basic functionality in application 110. The framework page may include root server side controls. For example, the framework page may include basic menus, exception handling, capture capabilities, controls for a user to change roles, controls for searching, or other framework controls. The framework page may also serve as a starting point for page-specific functionality by calling an application definition controller to receive a list of chapters that the user has access to (e.g., based on an association between the user's role and metadata chapters). The application definition controller may provide a mechanism to cache group information and may communicate with a data controller to access metadata in a database. The data controller may return the list of chapters to the application definition controller, and buttons for each chapter in the list may be incorporated into the framework page.

In an operation 330, the framework page may call the application definition controller to populate a page control container in the framework page. The application definition controller may retrieve a list of page controls (e.g., page controls 230-240) to display on the page. The list of page controls may be based on a combination of information in the request, a user's role, or other factors. An instance of each page control in the list of page controls may be created and loaded into the page. The structured metadata (as described above) may define which SPs and/or views the page controls should use to retrieve and/or present data. After retrieving all of the page controls for the user, in an operation 335, each page control may call into the application definition controller to retrieve a list of fields to display in the respective page controls. For example, each field in the list may include at least a database column name, a label text, and/or a control to use for displaying information about the field.

Processing then proceeds to a decisional operation 340, where it may be determined whether the request received in operation 305 is a save request. For example, a previous page may have included options for interacting with data and the user may have entered changes to the data. If the user did not enter changes, or elected to not save the changes, operation 340 may direct processing directly to an operation 350. If the user did elect to save changes, operation 340 may direct processing to an operation 345 to update a database. In one implementation, updating the database may include passing the changed data to a business entity controller using metadata retrieved by the page control in operation 335. The business entity controller may access and manipulate business-specific data by communicating with a business data control.

After each framework control, page control, and field control has been loaded, the controls may be bound to the database in operation 350. Binding the controls may include calling the business entity controller, which may use information in a page and/or field control to call a necessary SP to retrieve corresponding data to display. Operation 350 may also gather any error information encountered during the process of loading the page and the error information may be stored in a log file and/or packaged for display to the user. The process may then end by packaging all data for presentation, at which time the user has a fully populated screen with which the user may use to add, edit, search, or otherwise interact with data.

Implementations of the invention may be made in hardware, firmware, software, or various combinations thereof. The invention may also be implemented as instructions stored on a computer-readable medium, which may be read and executed using one or more processing devices. In one implementation, the computer-readable medium may include various mechanisms for storing and/or transmitting information in a form that can be read by a machine (e.g., a computing device). For example, a computer-readable storage medium may include read only memory, random access memory, magnetic disk storage media, optical storage media, flash memory devices, and other media for storing information, and a computer-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus those skilled in the art will recognize that various changes and modifications may be made to the preceding disclosure without departing from the scope or spirit of the invention, and the specification and drawings should therefore be regarded as exemplary only, with the scope of the invention to be determined solely by the appended claims.

What is claimed is:

1. A method for configuring a software application, comprising:

exposing a framework associated with a software application built on a service oriented architecture, wherein the software application includes one or more configuration utilities that expose the framework associated with the software application;

configuring the exposed framework associated the software application using the one or more configuration utilities, wherein configuring the exposed framework associated with the software application includes creating or extending one or more metadata records in a hierarchical metadata structure that controls the software application;

building a context container in response to an authenticated request associated with the software application, wherein the context container includes one or more pages configured with the one or more metadata records created or extended in the hierarchical metadata structure that controls the software application; and displaying a populated user interface associated with the software application, wherein the populated user interface includes the one or more configured pages associated with the context container.

2. The method of claim 1, wherein the context container further includes one or more page controls that define one or more data elements to display in the one or more configured pages.

3. The method of claim 2, wherein building the context container includes binding the one or more page controls to data source configured to store, the one or more metadata records and retrieve the one or more data elements to display in the one or more configured pages.

4. The method of claim 2, wherein the one or more metadata records created or extended in the hierarchical metadata structure control navigation among the one or more configured pages in the populated user interface and the one or more data elements displayed in the one or more configured pages.

5. The method of claim 2, wherein the one or more metadata records created or extended in the hierarchical metadata structure control interaction with the one or more configured pages in the populated user interface and the one or more data elements displayed in the one or more configured pages.

6. The method of claim 2, wherein configuring the exposed framework associated with the software application further includes creating or extending one or more data handlers that control interaction with the one or more configured pages in the populated user interface and the one or more data elements displayed in the one or more configured pages.

7. The method of claim 6, wherein the one or more data handlers further control converting the one or more data elements into a format associated with the exposed framework.

8. The method of claim 2, wherein configuring the exposed framework associated with the software application further includes creating or extending one or more event handlers that control one or more actions to initiate in response to one or more events associated with the software application.

9. The method of claim 2, wherein the one or more metadata records created or extended in the hierarchical metadata structure assign a user associated with the authenticated request to one or more roles that are further assigned to one or more groups associated with the software application.

10. The method of claim 9, wherein the hierarchical metadata structure contains the one or more data elements within the one or more configured pages, the one or more configured pages within one or more chapters, and the one or more chapters within the one or more groups.

11. The method of claim 10, wherein the hierarchical metadata structure contains the one or more data elements at a lowest level and the one or more groups at a highest level.

12. A computer-readable storage medium having computer-executable instructions recorded thereon, wherein executing the computer-executable instructions on one or more processing devices causes the one or more processing devices to:
expose a framework associated with a software application built on a service oriented architecture, wherein the software application includes one or more configuration utilities that expose the framework associated with the software application;
configure the exposed framework associated the software application using the one or more configuration utilities, wherein the one or more configuration utility create or extend one or more metadata records in a hierarchical metadata structure that controls the software application to configure the exposed framework associated with the software application;
build a context container in response to an authenticated request associated with the software application, wherein the context container includes one or more pages configured with the one or more metadata records created or extended in the hierarchical metadata structure that controls the software application; and
display a populated user interface associated with the software application, wherein the populated user interface includes the one or more configured pages associated with the context container.

13. The computer-readable storage medium of claim 12, wherein the context container further includes one or more page controls that define one or more data elements to display in the one or more configured pages.

14. The computer-readable storage medium of claim 13, wherein to build the context container, the computer-executable instructions further cause the one or more processing devices to bind the one or more page controls to a data source configured to store the one or more metadata records and retrieve the one or more data elements to display in the one or more configured pages.

15. The computer-readable storage medium of claim 13, wherein the one or more metadata records created or extended in the hierarchical metadata structure control navigation among the one or more configured pages in the populated user interface and the one or more data elements displayed in the one or more configured pages.

16. The computer-readable storage medium of claim 13, wherein the one or more metadata records created or extended in the hierarchical metadata structure control interaction with the one or more configured pages in the populated user interface and the one or more data elements displayed in the one or more configured pages.

17. The computer-readable storage medium of claim 13, wherein the one or more configuration utilities further create or extend one or more data handlers that control interaction with the one or more configured pages in the populated user interface and the one or more data elements displayed in the one or more configured pages to configure the exposed framework associated with the software application.

18. The computer-readable storage medium of claim 17, wherein the one or more data handlers further control converting the one or more data elements into a format associated with the exposed framework.

19. The computer-readable storage medium of claim 13, wherein the one or more configuration utilities further create or extend one or more event handlers that control one or more actions to initiate in response to one or more events associated with the software application to configure the exposed framework associated with the software application.

20. The computer-readable storage medium of claim 13, wherein the one or more metadata records created or extended in the hierarchical metadata structure assign a user associated with the authenticated request to one or more roles that are further assigned to one or more groups associated with the software application.

21. The computer-readable storage medium of claim 20, wherein the hierarchical metadata structure contains the one or more data elements within the one or more configured pages, the one or more configured pages within one or more chapters, and the one or more chapters within the one or more groups.

22. The computer-readable storage medium of claim 21, wherein the hierarchical metadata structure contains the one or more data elements at a lowest level and the one or more groups at a highest level.

23. A system comprising at least one processor and a memory containing computer-executable instructions, wherein executing the computer-executable instructions on the at least one processor causes the at least one processor to:

expose a framework associated with a software application built on a service oriented architecture, wherein the software application includes one or more configuration utilities that expose the framework associated with the software application;

configure the exposed framework associated the software application using the one or more configuration utilities, wherein the one or more configuration utility create or extend one or more metadata records in a hierarchical metadata structure that controls the software application to configure the exposed framework associated with the software application;

build a context container in response to an authenticated request associated with the software application, wherein the context container includes one or more pages configured with the one or more metadata records created or extended in the hierarchical metadata structure that controls the software application; and display a populated user interface associated with the software application, wherein the populated user interface includes the one or more configured pages associated with the context container.

24. The system of claim 23, wherein the context container further includes one or more page controls that define one or more data elements to display in the one or more configured pages.

25. The system of claim 24, wherein to build the context container, the computer-executable instructions further cause the at least one processor to bind the one or more page controls to a data source configured to store the one or more metadata records and retrieve the one or more data elements to display in the one or more configured pages.

26. The system of claim 24, wherein the one or more metadata records created or extended in the hierarchical metadata structure control navigation among the one or more configured pages in the populated user interface and the one or more data elements displayed in the one or more configured pages.

27. The system of claim 24, wherein the one or more metadata records created or extended in the hierarchical metadata structure control interaction with the one or more configured pages in the populated user interface and the one or more data elements displayed in the one or more configured pages.

28. The system of claim 24, wherein the one or more configuration utilities further create or extend one or more data handlers that control interaction with the one or more configured pages in the populated user interface and the one or more data elements displayed in the one or more configured pages to configure the exposed framework associated with the software application.

29. The system of claim 28, wherein the one or more data handlers further control converting the one or more data elements into a format associated with the exposed framework.

30. The system of claim 24, wherein the one or more configuration utilities further create or extend one or more event handlers that control one or more actions to initiate in response to one or more events associated with the software application to configure the exposed framework associated with the software application.

31. The system of claim 24, wherein the one or more metadata records created or extended in the hierarchical metadata structure assign a user associated with the authenticated request to one or more roles that are further assigned to one or more groups associated with the software application.

32. The system of claim 31, wherein the hierarchical metadata structure contains the one or more data elements within the one or more configured pages, the one or more configured pages within one or more chapters, and the one or more chapters within the one or more groups.

33. The system of claim 32, wherein the hierarchical metadata structure contains the one or more data elements at a lowest level and the one or more groups at a highest level.

* * * * *